United States Patent
Hashimoto (10) Patent No.: US 6,868,550 B1
(45) Date of Patent: Mar. 15, 2005

(54) CONDITIONAL ACCESS SYSTEM OF CATV

(75) Inventor: Kazunori Hashimoto, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/546,187

(22) Filed: Apr. 10, 2000

(30) Foreign Application Priority Data

Apr. 9, 1999 (JP) .......................................... 11-102391

(51) Int. Cl.[7] .......................... H04N 7/16; H04N 7/173
(52) U.S. Cl. .......................... 725/25; 725/27; 725/91; 725/93; 725/95; 725/109; 725/114; 725/116; 725/135; 725/138; 725/143; 725/144; 725/146
(58) Field of Search .............................. 725/25, 27, 91, 725/93, 109, 114, 116, 135, 138, 143–144, 146, 95

(56) References Cited

U.S. PATENT DOCUMENTS

| | | | |
|---|---|---|---|
| 5,557,316 A | * | 9/1996 | Hoarty et al. ................ 725/114 |
| 5,651,010 A | * | 7/1997 | Kostreski et al. ........... 348/614 |
| 5,659,350 A | | 8/1997 | Hendricks et al. |
| 5,682,195 A | | 10/1997 | Hendricks et al. |
| 5,734,589 A | * | 3/1998 | Kostreski et al. ........... 725/117 |
| 5,742,677 A | | 4/1998 | Pinder et al. |
| 5,802,063 A | * | 9/1998 | Deiss .......................... 725/151 |
| 5,883,661 A | * | 3/1999 | Hoarty ......................... 725/93 |
| 5,892,535 A | * | 4/1999 | Allen et al. .................... 725/36 |
| 5,990,927 A | * | 11/1999 | Hendricks et al. .......... 725/132 |
| 6,002,394 A | * | 12/1999 | Schein et al. ................. 725/39 |
| 6,041,056 A | * | 3/2000 | Bigham et al. ........ 370/395.64 |
| 6,160,545 A | * | 12/2000 | Eyer et al. ..................... 725/39 |
| 6,215,530 B1 | * | 4/2001 | Wasilewski ................. 725/151 |
| 6,305,018 B1 | * | 10/2001 | Usui et al. ..................... 725/49 |
| 6,351,474 B1 | * | 2/2002 | Robinett et al. .............. 725/97 |

FOREIGN PATENT DOCUMENTS

WO    WO 99/09743 A2    2/1999

* cited by examiner

*Primary Examiner*—John Miller
*Assistant Examiner*—Michael W. Hoye
(74) *Attorney, Agent, or Firm*—Sughrue Mion, PLLC (57) ABSTRACT

In a CATV system, a digital head end transmits both an area code and such data containing a management number and a channel contrastive table to a terminal of each of areas; each terminal stores thereinto both the area code and the channel contrastive table; and the digital head end retrieves the corresponding management number by comparing a channel display number of an analog program set every area with the channel contrastive table based on this area code, and then, displays the analog program of this retrieved management number.

9 Claims, 6 Drawing Sheets

CONDITIONAL ACCESS SYSTEM OF CATV

BACKGROUND OF THE INVENTION

1. Field of the Invention

The present invention relates to a CATV conditional access system in which digital programs are provided in a batch mode from a single digital head end to a plurality of areas. More specifically, the present invention relates to a CATV conditional access system capable of easily allocating channels of analog programs every area.

2. Description of the Related Art

Very recently, community antenna television systems (CATVs) are popularized while multi-media have been developed.

Figure 7:
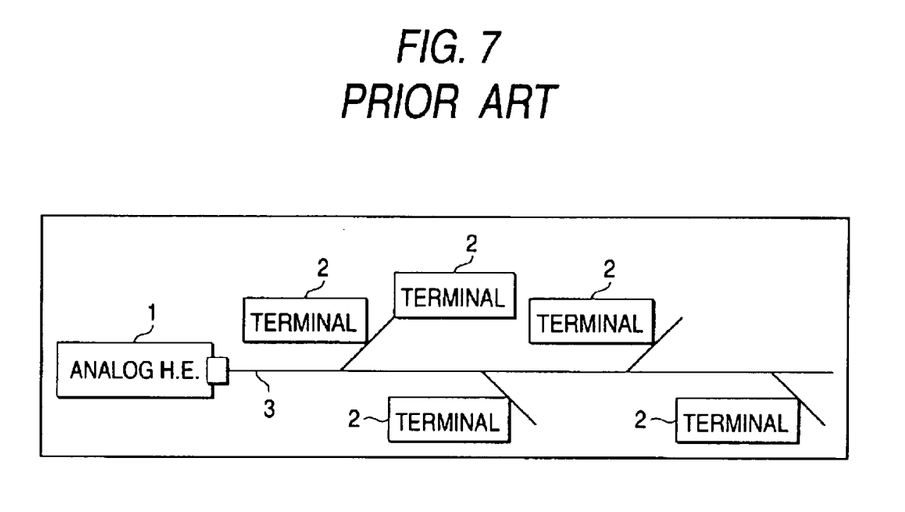
FIG. 7 is a system structural diagram for the conventional example.

As indicated in FIG. 7, this conventional CATV system is arranged as follows. That is, an analog head end (control center) 1 is installed in each of areas, terminals 2 set into homes of subscribers are connected via cables 3 to this analog head end 1, and then an analog picture signal (video/audio signal) is distributed from this analog head end 1 to the respective terminals 2 via a predetermined picture frequency channel.

Contrary to such an analog CATV system, a digital CATV system will be popularized, because of various needs, for instance, multi-channel broadcasting system, video-on-demand (VOD), and bidirectional communications.

While such an analog CATV system is transferred to a digital CATV system, in the case that an operation station of an existing analog CATV system starts a digital CATV broadcasting service, this operation station is required to commence distributions of digital picture signals without interrupting the distribution services to the subscribers which presently receive the existing analog broadcasting programs.

Figure 4:
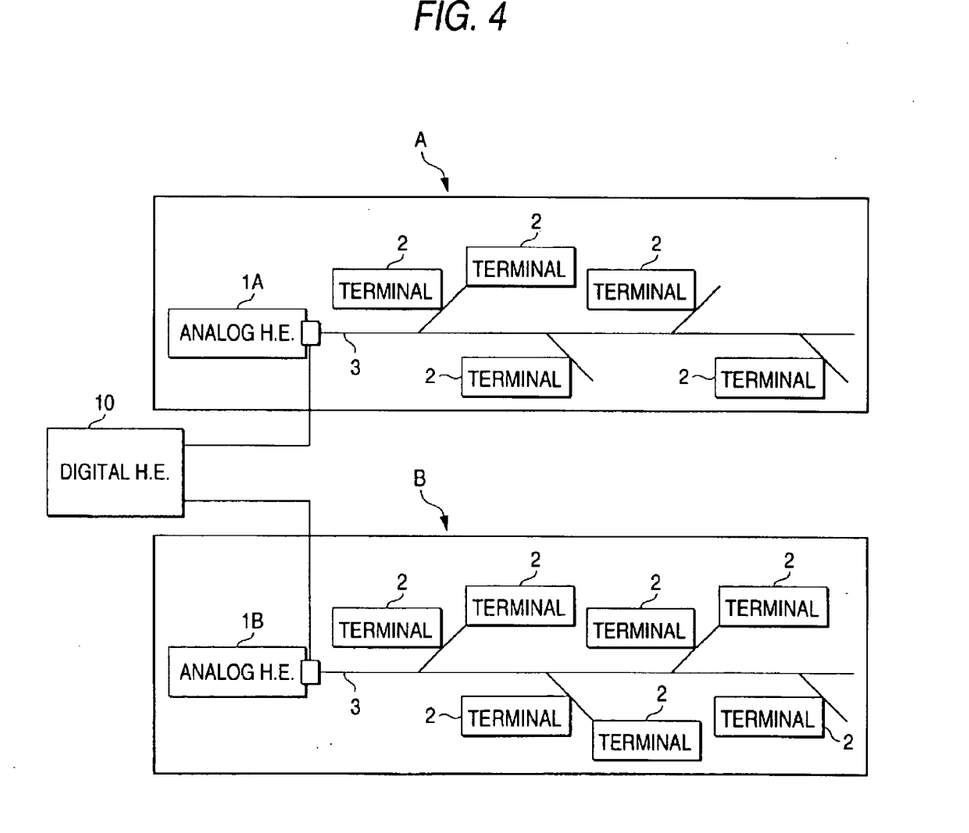
FIG. 4 is a system structural diagram for indicating an example of a digital integration type CATV to which the present invention is applied.

To meet such a need, the applicant of the present application has proposed such a novel digital integration type CATV system as shown in FIG. 4, since the investment amount required in such a case that the operation station of the existing analog CATV system is transferred from the analog CATV system to the digital CATV system is reduced, and further, the problem such as the installing space occurred when the digital CATV system is newly installed is solved. Accordingly, in order that the present analog CATV system can be smoothly transferred to the digital CATV system, as shown in FIG. 4, a new digital integration type CATV system has been proposed.

In this digital integration type CATV system, one digital head end 10 is installed with respect to a plurality of analog head ends 1A and 1B, and then this digital head end 10 will supply digital programs in a batch mode to the respective analog head ends 1A and 1B. The plural analog head ends 1A and 1B are installed in the respective areas A and B where the existing analog CATV system has been constructed. Furthermore, the provisions of the program information, and also the managements of the terminal 2 in each of the analog areas A and B are carried out in an integration manner.

However, the existing analog areas A and B own the specific program structures thereof as to the analog programs. The programs provided by the respective areas differ from each other. Otherwise, even when the same program is provided, the channel display numbers are made different from each other in the respective analog areas.

As a result, in such a case that the terminals 2 of the respective analog areas A and B are managed in a batch mode, and/or the program information is supplied in a batch mode by the digital head end 10, the program structures and the channel display numbers in the respective analog areas A and B must be united. Eventually, the loads given to the respective analog head ends 1A and 1B would be considerably increased.

Furthermore, such a fact that the program structures and the channel display numbers, which have been so far employed in the respective analog areas A and B, are changed, may induce unnecessary confusions to the viewers present in the respective analog areas.

SUMMARY OF THE INVENTION

The present invention has been made to solve such a problem of the CATV system in such a case that the above-explained terminals of the plural analog areas having the different program structures from each other are managed by a single digital head end.

In other words, the present invention has an object to provide a CATV conditional access system capable of managing terminals belonging to the respective analog areas in a batch mode by a digital head end without changing program structures and also channel display numbers in the existing analog areas in the CATV system.

To achieve the above-explained object, according to the invention, there is provided a CATV conditional access system comprising: a plurality of analog head ends for distributing a picture signal of an analog program and a picture signal of a transmitted digital program to a terminal belonging to each of areas; and a digital head end for transmitting a picture signal of a digital program to the plurality of analog head ends in a batch mode, wherein the digital head end transmits to the terminals within the areas, data containing both an area code used to recognize the own area belonging to each area, and a channel contrastive table for comparing a management number and a channel display number of an analog program every area, the management number being given to each of the analog program and being commonly used for the respective areas, and each of the terminals stores thereinto the area code and the channel contrastive table, and retrieves the corresponding management number by comparing the channel display number of the analog program set every area and the channel contrastive table based upon the area code, and then displays the analog program of the retrieved management number.

Further, according to the invention, there is provided a CATV conditional access method comprising the steps of: providing a plurality of analog head ends for distributing a picture signal of an analog program and a picture signal of a transmitted digital program to a terminal belonging to each of areas; providing a digital head end for transmitting a picture signal of a digital program to the plurality of analog head ends; transmitting to the terminals within the areas, data containing both an area code used to recognize the own area belonging to each area, and a channel contrastive table for comparing a management number and a channel display number of an analog program every area, the management number being given to each of the analog program and being commonly used for the respective areas; storing in each of the terminals the area code and the channel contrastive table; retrieving the corresponding management number by comparing the channel display number of the analog program set every area and the channel contrastive table based upon the area code; and displaying the analog program of the retrieved management number.

DETAILED DESCRIPTION OF THE PREFERRED EMBODIMENT

Referring now to the drawings, a preferred embodiment of the present invention will be described more in detail.

Figure 1:
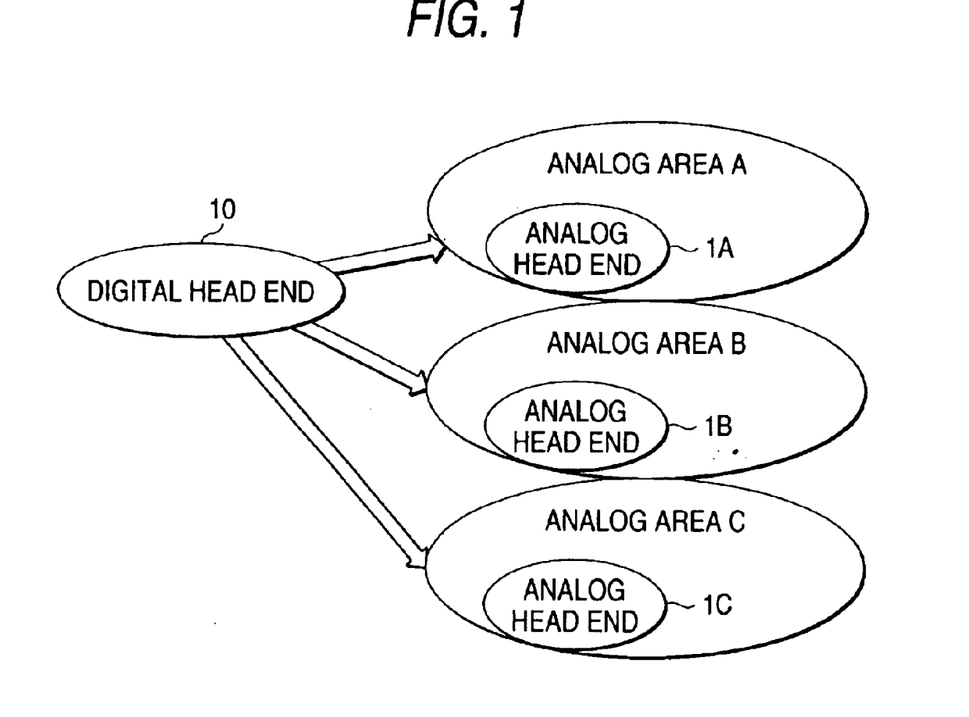
FIG. 1 is a system structural diagram for showing an example of an embodiment of the present invention.

FIG. 1 is a system conceptional diagram for representing an arrangement of a CATV conditional access system to which the present invention is applied.

This CATV system of FIG. 1 owns a similar arrangement to that of the CATV system shown in FIG. 4. From a digital head end 10, a picture signal of a digital program; program information related to this digital program and all of analog programs distributed to the respective analog head ends 1A, 1B and 1C; and furthermore, various sorts of data signals for managing terminals belonging to the analog areas A, B and C are supplied in a batch mode to the analog head ends 1A, 1B and 1C of the respective analog areas A, B and C.

Then, these picture signal and data signals are distributed to the terminals belonging to the respective analog areas via the respective analog head ends 1A, 1B and 1C.

In such a case that channel display numbers in the respective analog areas are different from each other as to analog programs provided in the respective analog areas, the analog programs in the respective terminals are managed based upon a united management number (will be explained later) contained in management data transmitted from the digital head end 10.

As will be discussed later, such data related to an analog program which is not provided in the own analog area to which the own terminal belongs, may be filtered by a conditional access operation executed based upon the management number in each of the terminals among the various sorts of data transmitted from the digital head end 10 in a batch mode.

Figure 2:
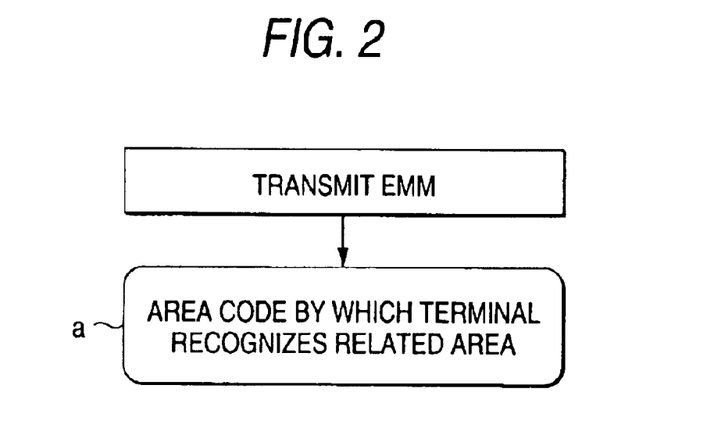
FIG. 2 is a conceptional diagram for explaining setting operation of a terminal in this example.
Figure 3:
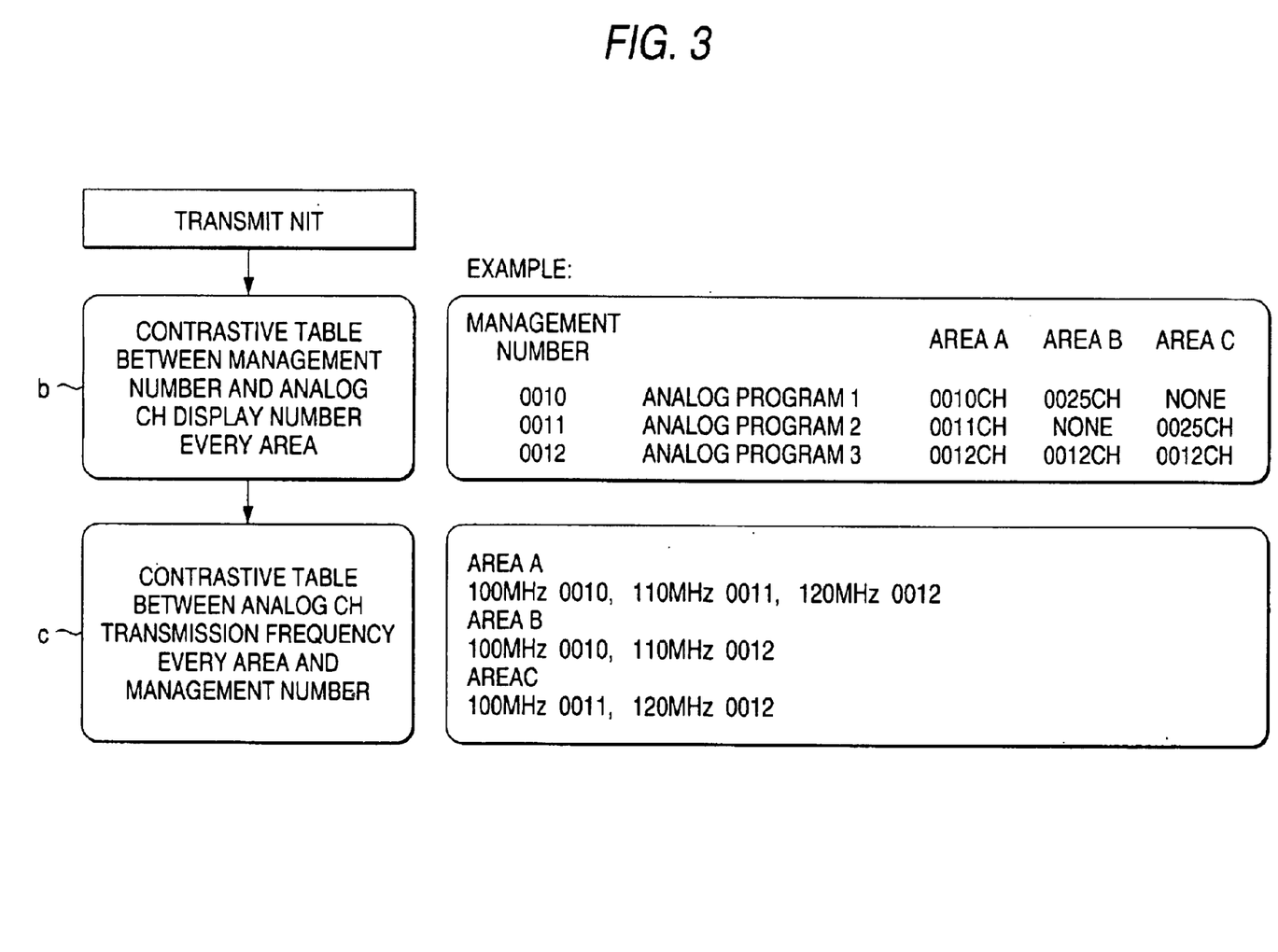
FIG. 3 is a conceptional diagram for explaining filtering of an analog program in this example.

FIG. 2 and FIG. 3 are conceptional diagrams for explaining a conditional access operation and a channel display control operation, executed in a terminal of each of these analog areas A, B and C.

Both the conditional access operation and the channel display control operation executed in each of these terminals are managed by a CPU built in the own terminal.

In FIG. 2, while the digital head end 10 firstly uses data ch prepared for a data transmission, this digital head end 10 transmits EMM data to the analog head ends 1A, 1B and 1C of the respective areas A, B and C. Each of these terminals receives this EMM data from each of the analog head ends 1A, 1B and 1C.

This EMM (Entitlement Management Message) data contains an area code "a" indicative of each of related (belonging) areas. Each of the terminals may recognize the own related area by storing this area code "a".

Then, as indicated in FIG. 3, while the digital head end 10 further uses a video ch so as to transmit a picture signal or a data ch, this digital head end 10 transmits NIT (Network Information Table) data to the analog head ends 1A, 1B and 1C, whereas each of the terminals receives this NIT data via the respective analog head ends 1A, 1B and 1C.

Now, in a digital broadcasting system using the transport stream (TS) of the MPEG-2, as data used in this broadcasting system, a PES packet is used. That is, an elementary stream in which both a video and an audio are digitally coded is processed in a packet form in this PES packet.

The coding process operation is standardized based upon program specific information (PSI). This program specific information (PSI) is constituted by a program association table (PAT), a TS program map table (PMT), a network information table (NIT), and an access table with a condition (CAT).

Among these tables, in the NIT, the following information is described, namely, channel information and frequency information used to switch a digital program and a channel, and information used to separate a multiplexed PES packet.

This NIT data contains an analog program contrastive table "b" and an analog ch transmission frequency contrastive table "c". The analog program contrastive table "b" compares a management number (will be explained) with an analog ch display number every analog area. The analog ch transmission frequency contrastive table "c" compares an analog ch transmission frequency every analog area with the management number.

In this case, a management number implies such a number which is commonly used to the respective areas, and is given to an analog program supplied from the digital head end 10 instead of a channel display number every area.

The analog program contrastive table "b" compares the respective analog programs managed by this management number With the analog ch display numbers in each of the areas A, B and C, and then establishes the correspondence relationship between the analog program and the analog ch display number. Furthermore, this analog program contrastive table "b" is to avoid such a case that a picture signal of such a not-provided analog program is received on the side of a terminal by this comparison.

In other words, this analog program contrastive table "b" represents that, for example, an analog program 1 to which a management number 0010 is given is indicated as "0010ch" in the area A, and is indicated as "0025ch" in the area B.

Furthermore, this analog program 1 to which the management number 0010 is given is not provided in the area C, since there is no channel display number corresponding thereto.

This state is similarly realized as to both an analog program 2 of a management number 0011 and an analog program 3 of a management number 0012.

As a result, at each of these terminals, a picture of analog program which is not provided in a relevant area is not displayed, but also a viewer never recognizes this not-provided analog program.

The analog ch transmission frequency contrastive table "c" is employed so as to compare a transmission frequency of an analog program distributed to each of the areas with a management number.

For instance, this analog ch transmission frequency contrastive table "c" represents that the analog program 1 of the management number 0010 is transmitted at a frequency of 100 MHz in the area B. In such a case that a channel selection of the analog program 1 is carried out based upon EPG and/or the channel display number of 0025ch of this analog program 1 in the area B is inputted, a terminal belonging to the area B is tuned to 100 MHz corresponding to the management number 0010 of this analog program 1 so as to receive this picture signal, and display the picture of this picture signal together with the analog ch display number 25.

Figure 5:
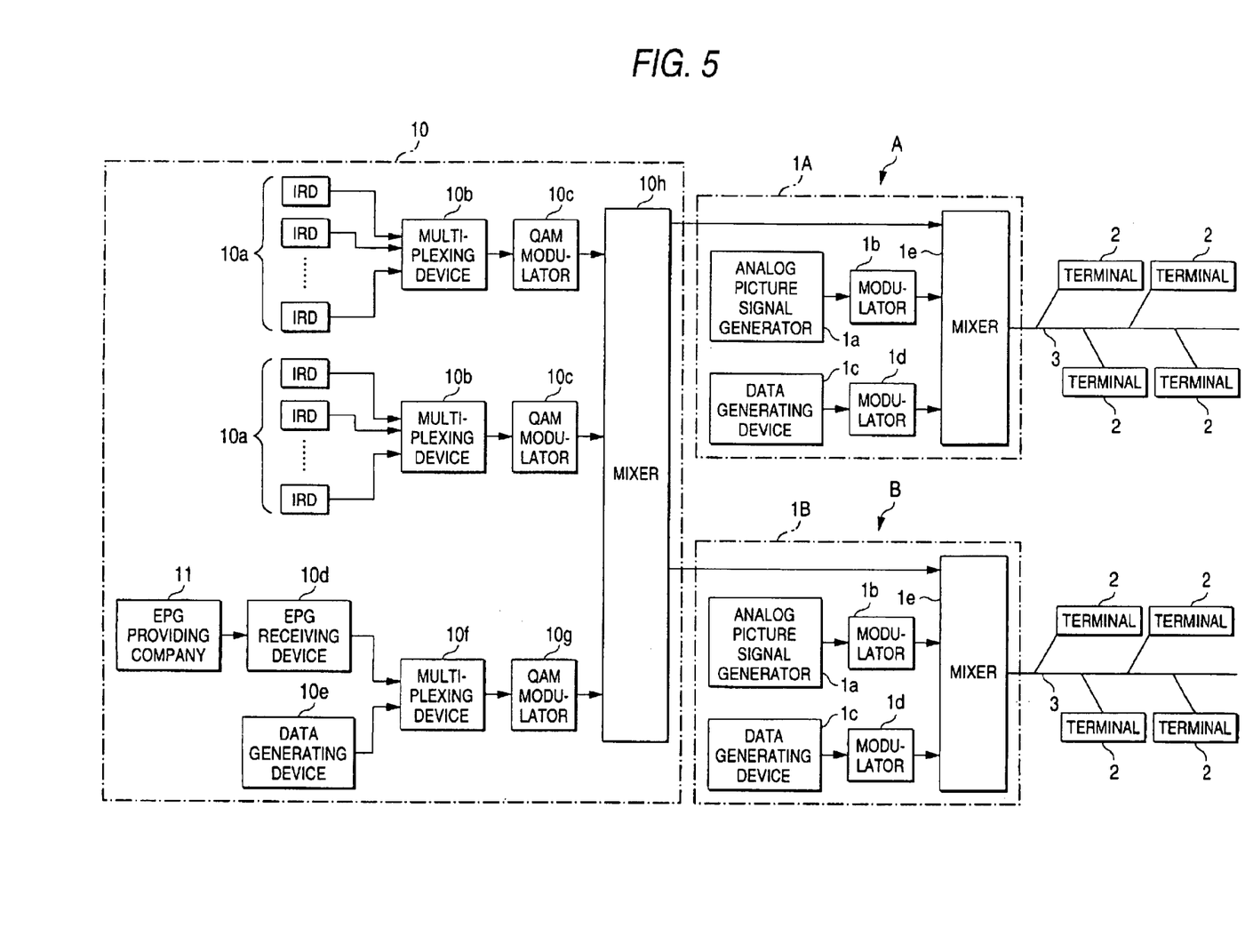
FIG. 5 is a system structural diagram for showing a CATV system according to the embodiment of the present invention.

In FIG. 5 schematically indicates an arrangement of an analog head end and a digital head end.

In FIG. 5, the digital head end 10 is so arranged that digital picture signals supplied from a plurality of receiving device (IRD) 10a are multiplexed by a multiplexing device 10b, and then, this multiplexed signal is QAM-modulated by a QAM modulator 10c.

A preselected number of digital picture signal distribution systems are constructed in a proper manner. This digital picture signal distribution system is arranged by this IRD 10a, the multiplexing device 10b, and the QAM modulator 10c.

Next, a description will now be made of a structure of a data signal containing EPG information.

The EPG information is received by an EPG receiving device 10d. The EPG information is regularly, or irregularly supplied from an EPG providing company 11.

On the other hand, a data generating device 10e generates other data such as conditional access information.

Then, a multiplexing device 10f multiplexes the EPG information derived from the EPG receiving device 10d and the various sorts of data generated from the data generating device 10e, and this multiplexed signal is QAM-modulated by a QAM modulator 10g.

Both the digital picture signal and the data derived from the QAM modulators 10c and 10g are mixed with each other by a mixer 10h, and then, the mixed data is transmitted through separate channels to the analog head ends 1A and 1B, respectively.

It should be noted that as previously described, both the digital picture signal and the data are multiplexed based upon the MPEG-2 standard.

In the analog head end 1A of the area A, for example, a local broadcasting signal is outputted from an analog picture signal generator 1a, this local broadcasting signal is modulated by a modulator 1b, and furthermore, data such as fee information generated by a data generating device 1c is analog-modulated by a modulator 1d.

These analog picture signals, the data derived form the modulator 1d, and both the digital picture signal and the data derived from the digital head end 10 are mixed with each other by a mixer 1e, and then, the mixed signal/data is distributed to the respective terminals 2.

It should also be noted that the analog head end 1B of the area B is constructed of a similar arrangement.

With respect to the single digital head end 10, a plurality of analog head ends 1A and 1B located in each of these areas are connected. Both the digital picture signal and the data, which are transmitted from the digital head end 10, are sent to the analog head ends 1A and 1B arranged in these areas A and B. Then, these digital picture signal and data are distributed via the respective analog head ends 1A and 1B to the respective terminals 2 connected to the analog head ends 1A and 1B in combination with the analog signal.

Figure 6:
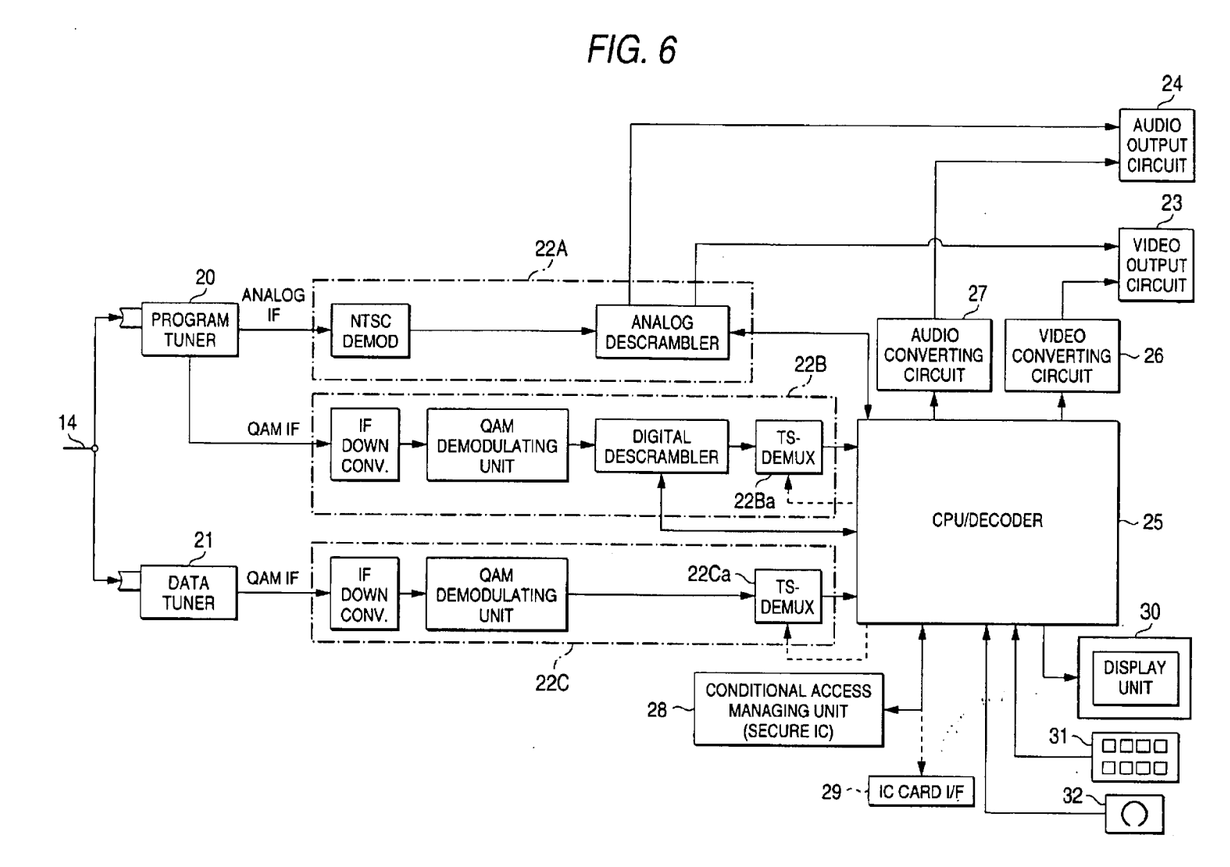
FIG. 6 is a circuit diagram of a digital terminal employed in the system of the present invention.

FIG. 6 is a schematic block diagram for showing an arrangement of the digital terminal 2 connected to the analog head ends 1A and 1B in each of the analog areas.

In FIG. 6, a digital picture signal, an analog picture signal, and the data supplied from the digital head end 10 are distributed to a program tuner 20 and a data tuner 21.

Then, after the video/audio signals of the analog picture signal series which are entered into the program tuner 20 are processed by an analog picture signal processing circuit 22A, a video signal and an audio signal of this processed picture signal are outputted to a video output circuit 23 and an audio output circuit 24, respectively.

In the analog picture signal processing circuit 22A, an analog picture IF signal of the NTSC system outputted from the program tuner 20 is demodulated by an NTSC demodulator, and when the analog picture signal transmitted from the analog head end 11 is scrambled, this scrambled analog picture signal is descrambled by way of analog descramble circuit, and thereafter the descrambled analog picture signal is entered into a CPU/Decoder 25 provided at a post stage.

Also, the video/audio signals of the digital picture signal series are processed by a digital picture signal processing circuit 22B, and thereafter, the processed digital video/audio signals are inputted to the CPU/Decoder 25.

In the digital picture signal processing circuit 22B, the digital picture IF signal which is QAM-modulated is down-converted by an IF downconverter, and then, the down-converted digital picture IF signal is demodulated by a QAM demodulator.

Then, in such a case that the digital picture signal which is transmitted from the digital head end 10 is scrambled, this scrambled digital picture signal is descrambled by a digital descramble circuit. Thereafter, a transport stream (TS) of MPEG-2 is demultiplexed by a TS-demultiplexer, and the demultiplexed transport stream is entered to the CPU/Decoder 25 provided at the post stage.

Both the digital video signal and the digital-audio signal derived from this CPU/Decoder 25 are supplied via a video converting circuit 26 and an audio converting circuit 27 to the video output circuit 23 and the audio output circuit 24.

On the other hand, a digital data signal which is inputted into the data tuner 21 is processed by a digital data signal processing circuit 22C. Thereafter, the processed digital data signal is entered to the CPU/Decoder 25. From this CPU/Decoder 25, the processed digital data signal is supplied via the video converting circuit 26 and the audio converting circuit 27 to the video output circuit 23 and the audio output circuit 24, respectively.

Similarly to the digital picture signal processing circuit 22B, in the data signal processing circuit 22C, the digital data IF signal which is QAM-modulated is down-converted by an IF downconverter, and then, the down-converted digital data IF signal is demodulated by a QAM demodulater.

Then, a TS-demultiplexer demultiplexes various sorts of data such as EPG data, which is multiplexed on the transport stream (TS) in accordance with the MPEG-2 standard. The demultiplexed data is entered to the CPU/Decoder 25 provided at the post stage.

It should also be noted that in FIG. 6, reference numeral 28 denotes a conditional access managing unit; 29, an IC card I/F; 30, a display unit for displaying a channel or the like; 31, an operation key input unit; and 32, a remote controller receiving unit.

In the CATV conditional access system with employment of the above-explained arrangement, the data generating device 10e of the digital head end 10 transmits EMM data to the analog head ends 1A and 1B of the respective areas by using the data ch, and then, this EMM data is received and demodulated by the data tuner 21 of the terminal 2 belonging to each of the areas and the data signal processing circuit 22C thereof. The demodulated EMM data is entered into the CPU/Decoder 25.

The each terminal 2 recognizes the area to which the own terminal 2 belongs based upon the area code "a" contained in the EMM data.

Also, the terminal 2 receives/demodulates both the analog number contrastive table "b" and the analog ch transmission frequency contrastive table "c", contained in the NIT data, and then, sets the display ch and the performs the conditional access with reference to both the analog number contrastive table "b" and the recognized belonging area.

Also, the terminal 2 selects the analog program and also sets the tuning frequency based on the EPG with reference to the analog ch transmission frequency contrastive table "c" and the belonging area.

As previously explained, in the above-described conditional access system, in such a case that the different program structures in a plurality of analog areas are managed by the digital head end in a batch mode, this analog program is managed not by the channel display number every analog area, but by the management number commonly used in the respective analog areas. As a consequence, even when the program structures of the analog programs are different from each other every analog area, or the channel display numbers are different from each other, the program structures and the channel display numbers need not be united among these analog areas, but also the channel allocation can be readily carried out with respect to each of the analog areas.

What is claimed is:

1. A CATV conditional access system comprising:
   a plurality of analog head ends for distributing picture signals of analog programs and picture signals of transmitted digital programs to terminals provided in respective areas; and
   a digital head end for transmitting the picture signals of the digital programs to the plurality of analog head ends,
   wherein said digital head end transmits to the terminals within the areas, via the analog head ends, data containing an area code used to recognize the area to which each terminal belongs, and data containing a channel contrastive table for comparing a management number that is uniquely allocated to each analog program and is commonly used in all the areas for each respective analog program and a channel display number used in each area for selecting an analog program, and
   each of said terminals stores thereinto the area code and the channel contrastive table, and retrieves the corresponding management numbers from the channel contrastive table by comparing the channel display numbers for selecting the analog programs set for each area and the area code, and then displays the channel display number for selecting the analog program of the retrieved management number.

2. The CATV conditional access system as claimed in claim 1, wherein both the data indicative of the area code and the data indicative of the channel contrastive table are transmitted from said digital head end to the terminals of the respective areas respectively via a channel used to transmit the picture signal.

3. The CATV conditional access system as claimed in claim 1, wherein said digital head end transmits data about an analog channel transmission frequency contrastive table to the terminals of the respective areas, said analog channel transmission frequency contrastive table comparing the management number with a transmission frequency of an analog program within each of the areas, and
   each of the terminals stores thereinto the analog channel transmission frequency contrastive table, such that when a channel display number for selecting an analog program is designated, said each terminal retrieves a management number corresponding to the designated channel display number from the channel contrastive table based upon the area code, and said each terminal retrieves a transmission frequency of an analog program corresponding to the retrieved management number from the analog channel transmission frequency contrastive table so as to be tuned to the retrieved transmission frequency.

4. The CATV conditional access system as claimed in claim 3, wherein the data indicative of the analog channel transmission frequency contrastive table are transmitted from said digital head end to the terminals of the respective areas respectively via a channel used to transmit the picture signal.

5. A CATV conditional access method comprising the steps of:
   providing a plurality of analog head ends for distributing picture signals of analog programs and picture signals of transmitted digital programs to terminals provided in respective areas;
   providing a digital head end for transmitting the picture signals of digital programs to the plurality of analog head ends;
   transmitting to the terminals within the areas, via the analog head ends, data containing an area code used to recognize the area to which the area belongs, and data containing a channel contrastive table for comparing a management number that is uniquely allocated to each analog program and is commonly used in all the areas for each respective analog program, and a channel display number used in each area for selecting an analog program;
   storing in each of said terminals the area code and the channel contrastive table;
   retrieving the corresponding management numbers from the channel contrastive table by comparing the channel display numbers for selecting the analog programs set for each area and the area code; and
   displaying the channel display number for selecting the analog program of the retrieved management number.

6. A CATV conditional access system according to claim 1, wherein both the data indicative of the area code and the data indicative of the channel contrastive table are transmitted from said digital head end to the terminals of the respective areas respectively via a data transmission channel which is separately provided with a channel for transmitting the picture signal.

7. A CATV conditional access system according to claim 3, wherein the data indicative of the analog channel transmission frequency contrast table are transmitted from said digital head end to the terminals of the respective areas respectively in a data transmission channel which is separately provided with a channel for transmitting the picture signal.

8. A CATV conditional access system according to claim 1, wherein said digital head end transmits EMM data that includes said area code, and said digital head end transmits NIT data that includes said channel contrastive table.

9. A CATV conditional access system comprising:
   a digital head end for transmitting picture signals of digital programs to a plurality of analog head ends, the plurality of analog head ends for distributing picture signals of analog programs and the picture signals of the transmitted digital programs to terminals provided in respective areas, wherein said digital head end transmits to the terminals, via the analog head ends, data containing an area code used to recognize the area to which each terminal belongs, and data containing a channel contrastive table, wherein the channel contrastive table compares a management number with a channel display number, the management number being uniquely allocated to each analog program and commonly used in all the areas for each respective analog program, and the channel display number used in each area for selecting an analog program.

* * * * *